Patented Oct. 7, 1941

2,258,546

UNITED STATES PATENT OFFICE 2,258,546

RESINOUS CEMENT CAPABLE OF HARDENING RAPIDLY IN THE COLD AND PROCESS OF PREPARING IT

Karl Dietz, Cronberg, Taunus, Heinrich Greune, Frankfort-on-the-Main-Hochst, and Franz Privinsky, Hofheim, Taunus, Germany, assignors, by mesne assignments, to Pen-Chlor, Incorporated, Philadelphia, Pa., a corporation of Delaware No Drawing. Application November 17, 1938, Serial No. 241,016. In Germany November 24, 1937

8 Claims. (Cl. 260—38)

The present invention relates to resinous products capable of hardening rapidly in the cold and to a process of preparing them.

It has already been proposed to prepare phenol-formaldehyde resin masses which harden rapidly in the cold by mixing a phenol-formaldehyde resin which has only been condensed to such a degree that it is still in the liquid state, with an aralkyl chloride or aralkyl sulphate which is neutral to water.

According to the present invention, there is used instead of or in addition to the aralkyl chloride or aralkyl sulphate a corresponding aliphatic ester provided that there is also present in the mass an ingredient of acid or neutral reaction which as such is capable of causing hardening of the phenol-formaldehyde masses, for instance, an aromatic sulphochloride.

The said esters may be incorporated as such or in admixture with filling materials, if desired also with addition of a substance of good thermal conductivity, for instance, a silicon compound or graphite, with the liquid formaldehyde resin, together with the hardening agent.

The resinous products are suitably prepared by mixing the pre-condensed still liquid phenol-formaldehyde resin or a solution thereof with the above named esters and storing the whole. In this case such esters are preferably used as do not of themselves cause the resin masses to harden. On use the said liquid mixture is mixed with a cement powder containing the hardening agents such as aromatic sulphochlorides, acid or neutral persulphates, titanium sulphate or metal dioxides such as lead dioxide or manganese dioxide in the solid state; furthermore it may contain indifferent filling materials.

The resinous products thus obtained may be used for the manufacture of cements, plasterings or concrete-like coverings and also moulded bodies, such as stones or plates, also filter stones or filter bottoms, which are solid, hard and stable towards mechanical and chemical influences. By using a suitable liquid phenol-formaldehyde resin, for instance a resin in which the molecular proportion of the phenol to formaldehyde is 1:1.4 (but also, according to the kind of the ester used, resins in which the phenol and formaldehyde are in other molecular proportions), products are obtained which are not only acid-proof but also alkali-proof.

Special attention is drawn to the fact that only the combination of the above esters with the substances producing the hardening yields in comparison with the hitherto known hardening substances or hardening agents products having an especially good chemical stability, particularly towards alkalis.

The following example serves to illustrate the invention, but it is not intended to limit it thereto:

10 grams of para-toluenesulphochloride are mixed with 60 grams of barium sulphate and 20 grams of coarse grained powdered quartz and the cement powder thus prepared is then mixed with a liquid consisting of 30 cc. of a pre-condensed liquid phenol-formaldehyde resin and 10 cc. of glycol-chlorhydrin.

Instead of or in addition to glycol-chlorhydrin there may also be used: dichlorhydrin or dichloropropanol, epichlorhydrin, ethylene chloride, diethyl sulphate, an alkyl sulfate or another similar ester.

We claim:

1. A process of preparing an acid-proof and alkali-proof cement capable of hardening rapidly in the cold which comprises mixing para-toluenesulphochloride with inert filling material and mixing the cement powder thus prepared with a liquid consisting of phenol-formaldehyde resin which has only been condensed to such a degree that it is still in the liquid state, and glycol-chlorhydrin.

2. A resinous product containing in admixture para-toluenesulphochloride, an inert filling material, a liquid consisting of phenol-formaldehyde resin which has only been condensed to such a degree that it is still in the liquid state, and glycol-chlorhydrin.

3. The process of claim 1 wherein the phenol-formaldehyde resin has a molecular proportion of phenol to formaldehyde of about 1 to 1.4, and wherein the inert filling material comprises barium sulphate and coarse grained powdered quartz.

4. The product of claim 2 wherein the phenol-formaldehyde resin has a molecular proportion of phenol to formaldehyde of about 1 to 1.4, and wherein the inert filling material comprises barium sulphate and coarse grained powdered quartz.

5. In the process of preparing an acid-proof and alkali-proof resinous product capable of hardening rapidly in the cold from a phenol-formaldehyde resin which has only been condensed to such an extent that it is still in the liquid state and an acid to neutral hardening agent which as such is capable of causing hardening of the phenol-formaldehyde resin, the step which comprises admixing the said ingredients with an aliphatic ester of the formula CH₂Cl.R where R represents a radical selected from the group consisting of —CH₂Cl; —CH₂OH; —CHOH.CH₂Cl; —CHCl.CH₂OH; and

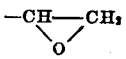

6. The process of claim 5 wherein the phenol-formaldehyde resin has a molecular proportion of phenol to formaldehyde of about 1 to 1.4.

7. A resinous product comprising a phenol-formaldehyde resin which has been condensed to such an extent that it is still in the liquid state, and an acid to neutral hardening agent which as such is capable of causing hardening of the phenol-formaldehyde resin, containing an admixture an aliphatic ester of the formula CH₂Cl.R where R represents a radical selected from the group consisting of —CH₂Cl; —CH₂OH; —CHOH.CH₂Cl; —CHCl.CH₂OH; and

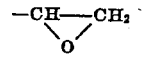

8. The product of claim 7 wherein the phenol-formaldehyde resin has a molecular proportion of phenol to formaldehyde of about 1 to 1.4.

KARL DIETZ.
HEINRICH GREUNE.
FRANZ PRIVINSKY.